US007398301B2

(12) United States Patent
Hennessey et al.

(10) Patent No.: US 7,398,301 B2
(45) Date of Patent: Jul. 8, 2008

(54) METHOD AND APPARATUS FOR FACILITATING DISTRIBUTED DELIVERY OF CONTENT ACROSS A COMPUTER NETWORK

(75) Inventors: Wade L Hennessey, Palo Alto, CA (US); John B. Wainwright, Los Gatos, CA (US)

(73) Assignee: Kontiki, Inc., Sunnyvale, CA (US)

( * ) Notice: Subject to any disclaimer, the term of this patent is extended or adjusted under 35 U.S.C. 154(b) by 1091 days.

(21) Appl. No.: 10/211,602

(22) Filed: Aug. 2, 2002

(65) Prior Publication Data
US 2003/0028623 A1 Feb. 6, 2003

Related U.S. Application Data

(60) Provisional application No. 60/310,306, filed on Aug. 4, 2001.

(51) Int. Cl.
*G06F 15/16* (2006.01)
*H04N 7/16* (2006.01)
*H04L 12/50* (2006.01)

(52) U.S. Cl. .............................. 709/217; 725/4; 725/16; 725/24; 725/25; 725/48; 712/26; 715/733; 707/1; 707/2; 707/3; 707/5; 707/9; 707/10; 370/412

(58) Field of Classification Search .................. 725/4, 725/16, 24, 25, 48, 49, 50, 105; 370/412; 712/26; 715/733; 707/1, 2, 3, 5, 9, 10; 719/311, 719/312; 726/3, 12, 27
See application file for complete search history.

(56) References Cited

U.S. PATENT DOCUMENTS

| 5,191,650 | A | 3/1993 | Kramer et al. |
| 5,321,815 | A | 6/1994 | Bartolanzo et al. |
| 5,884,031 | A | 3/1999 | Ice .............................. 395/200 |
| 6,014,667 | A | 1/2000 | Jenkins et al. ................. 707/10 |
| 6,185,598 | B1 | 2/2001 | Farber et al. |
| 6,678,264 | B1 | 1/2004 | Gibson |
| 6,816,862 | B2 | 11/2004 | Mulgund et al. |

(Continued)

FOREIGN PATENT DOCUMENTS

EP    0 618 708 A2    2/1994

(Continued)

OTHER PUBLICATIONS

U.S. Appl. No. 60/252,658.*

(Continued)

*Primary Examiner*—Ashok Patel
(74) *Attorney, Agent, or Firm*—Blakely, Sokoloff, Taylor & Zafman, LLP; Judith A. Szepesi

(57) ABSTRACT

One embodiment of the present invention provides a system that facilitates receiving content at a client from one or more servers that can potentially provide the content. The client starts by sending a request for the content to a directory server. In response to the request, the client receives a list of candidate servers that can potentially provide the content from the directory server. Once the client has received the list of candidate servers, the client sends a request to one or more of the candidate servers for the content, and subsequently receives the content from one or more of the candidate servers.

70 Claims, 5 Drawing Sheets

U.S. PATENT DOCUMENTS

| | | |
|---|---|---|
| 6,832,253 B1 | 12/2004 | Auerbach |
| 6,975,619 B1 | 12/2005 | Byers et al. |
| 7,020,719 B1 | 3/2006 | Grove et al. |
| 7,065,584 B1 | 6/2006 | Shavitt et al. |
| 7,072,982 B2 | 7/2006 | Teodosiu et al. |
| 7,193,968 B1 | 3/2007 | Kapoor et al. |
| 7,200,658 B2 | 4/2007 | Goeller et al. |
| 2002/0026511 A1 | 2/2002 | Garcia-Luna-Aceves et al. |
| 2002/0062336 A1 | 5/2002 | Teodosiu et al. |
| 2002/0062375 A1 | 5/2002 | Teodosiu et al. |
| 2002/0107982 A1* | 8/2002 | Teodosiu et al. ............ 709/245 |
| 2002/0143918 A1 | 10/2002 | Soles et al. |
| 2002/0143991 A1 | 10/2002 | Chow et al. |
| 2002/0152318 A1 | 10/2002 | Menon et al. |
| 2003/0097438 A1 | 5/2003 | Bearden et al. |
| 2003/0099202 A1 | 5/2003 | Lear et al. |
| 2004/0264385 A1 | 12/2004 | Hennessey et al. |
| 2004/0267875 A1 | 12/2004 | Hennessey et al. |
| 2005/0004916 A1 | 1/2005 | Miller et al. |
| 2006/0149806 A1* | 7/2006 | Scott et al. .................. 709/201 |

FOREIGN PATENT DOCUMENTS

| | | | |
|---|---|---|---|
| WO | WO 01/93064 A1 | 12/2001 | |

OTHER PUBLICATIONS

U.S. Appl. No. 60/252,659.*

Sidman et al., Apparatus, Method and System for Effecting Information Access in a Peer Environment, Aug. 1, 2002, WO 02/058453.*

Publication entitled: "Locating Copies of Objects Using the Domain Name System", by Jussi Kangasharju, et al, Proceedings of the International Caching Workshop, XP002197618, XX, XX, 1999, pp. 1-12.

Publication entitled: "Domain Caching: Building Web Services for Live Events", by V. Vellanki; A. L. Chervenak, The Second IEEE Workshop on Internet Applications, WIAPP 2001, vol ISBN 0-7695-1137-6, XP-002219309 pp. 133 to 142.

Amini, Lisa, et al, "Modeling Redirection in Geographically Diverse Server Sets," Proceedings of the 12th International Conference on World Wide Web WWW '03, May 20, 2003, ACM Press, pp. 472-481.

Wang, Limin, et al, "The Effectiveness of Request for Redistribution on CDN Robustness," 5th Symposium on Operating Systems Design and Implementation, ACM SIGOPS Operating Systems Review, Dec. 2002, ACM Press, pp. 345-360.

Krishnamurthy, Balachander, et al, "On the Use and Performance of Content Distribution Networks," Proceedings of the 1st ACM SIGCOMM Workshop on Internet Measurement IMW'01, Nov. 2001, ACM Press, pp. 169-182.

\* cited by examiner

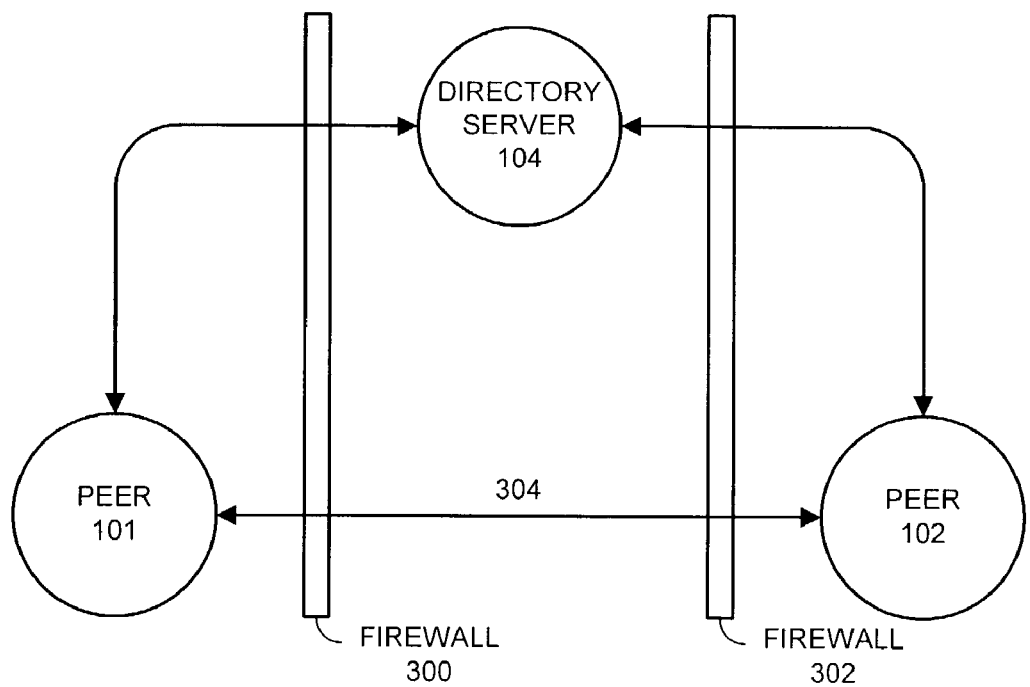
FIG. 3
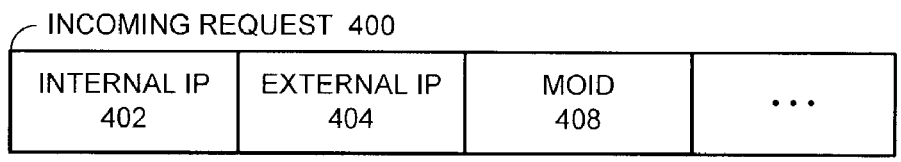
FIG. 4
| MOID 408 | NODE 502 | RANGE SET 504 |
|---|---|---|
| | | |
INVENTORY 212
FIG. 5

METHOD AND APPARATUS FOR FACILITATING DISTRIBUTED DELIVERY OF CONTENT ACROSS A COMPUTER NETWORK

RELATED APPLICATION

This application hereby claims priority under 35 U.S.C. §119 to U.S. Provisional Patent Application No. 60/310,306, filed on Aug. 4, 2001, entitled "Method and Apparatus for Enabling the Rich Media Revolution," by inventors Wade L. Hennessey, John B. Wainwright, Anthony A. Espinoza, Christopher G. Saito and Michael J. Homer.

BACKGROUND

1. Field of the Invention

The present invention relates to computer networks. More specifically, the present invention relates to a method and an apparatus for facilitating distributed delivery of content across a computer network.

2. Related Art

The explosion of broadband communications has helped the Internet become a viable distribution mechanism for multimedia and high quality video. Prior to broadband, conventional modems were much to slow for the large file sizes that video demands. Now that more and more people have broadband connections and are requesting ever larger items of content, bandwidth and server utilization is quickly becoming a bottleneck on the distribution end. In some cases, extraordinary events have brought online news sites to a virtual standstill as people flocked to them to see video of the events.

Some companies have tried to solve this problem by creating server farms and clusters. These have been effective in handling routine peaks in demand and creating a level of fault-tolerance, but overall, they have been ineffective in handling demand resulting from an extraordinary event.

Another issue with increased bandwidth is the cost of the increased bandwidth to service providers. The Internet is made up of numerous smaller networks that have peering arrangements between them. Service providers typically have to pay more for information that is passed outside of their network. Likewise, companies typically have to pay more as the level of information they request increases.

Attempts have been made to alleviate these problems by creating peer-to-peer distributed content delivery networks. In these networks, peers that have previously downloaded content become potential servers for the content for other peers that subsequently request the content. While these content delivery networks have succeeded at moving traffic away from the server farms where the information was originally published, they have created new problems.

One of the biggest problems in classic peer-to-peer networks is performance. Quite often, a peer that a client is routed to for downloading content has limited bandwidth and is topologically distant on the network. In this case, download times at the client end can actually increase, and bandwidth cost can increase as well because the traffic has to travel across more networks.

Another major problem with distributed content delivery networks is the increased local traffic resulting from local searches for content. More clients on the network result in more local searches. As these distributed networks grow, they actually degrade or split into smaller subsets of the entire network.

What is needed is a method and apparatus for facilitating the distributed delivery of content across a network without the problems associated with existing distributed content delivery networks.

SUMMARY

One embodiment of the present invention provides a system that facilitates receiving content at a client from one or more servers that can potentially provide the content. The client starts by sending a request for the content to a directory server. In response to the request, the client receives a list of candidate servers that can potentially provide the content from the directory server. Once the client has received the list of candidate servers, the client sends a request to one or more of the candidate servers for the content, and subsequently receives the content from one or more of the candidate servers.

In a variation on this embodiment, the client receives portions of the content from multiple candidate servers. The client then assembles the content from the various portions.

In a variation on this embodiment, the client sends feedback to the server indicating the current status of the content at the client. This feedback specifies which portions of the content that have been received by the client; which portions of the content that are currently being received by the client; and which portions of the content that have not been received by the client.

In a variation on this embodiment, the client sends feedback to the server containing status information for the candidate servers maintained at the client. This feedback can include availability of a given candidate server, a performance indicator for the given candidate server, and a trace of a path from the client to the given candidate server.

In a variation on this embodiment, sending the request to the directory server for the content further involves sending a map of the content that indicates what potions of the content the client already has. Additionally, for clients that are located behind a Network Address Translation (NAT) device, sending the request also involves sending the internal IP address of the client.

In a variation on this embodiment, the client receives a request from a secondary client to send the content to the secondary client. In response to the request, the client sends the content to the secondary client.

In a further variation on this embodiment, the client sends portions of the content to the secondary client while the client is still receiving portions of the content from a candidate server.

In a variation on this embodiment, the list of candidate servers is a subset of the complete list of candidate servers.

In a further variation on this embodiment, the client sends a request to the directory server requesting an additional subset of the complete list of candidate servers.

In a variation on this embodiment, the list of candidate servers includes an origin server containing the original source for the content. The list of candidate servers also includes mirror servers, where are similar in performance to the origin server, but contain copies of the original source for the content.

In a variation on this embodiment, if the content is not available from a candidate server in the list of candidate servers, the client waits a set period of time before again trying to receive the content from the candidate server.

In a further variation on this embodiment, the set period of time increases each time the client is unsuccessful in receiving the content from any candidate server.

In a further variation on this embodiment, if the content is not available from a candidate server in the list of candidate servers for a certain period of time, the candidate server is removed from the list of candidate servers.

In a further variation on this embodiment, if the candidate server does not meet certain performance criteria, the candidate server is removed from the list of candidate servers.

One embodiment of the present invention provides a system that facilitates sending content to a client in a distributed manner. The system starts by receiving a request for content from the client at a directory server. The directory server subsequently sends a response to the client. This response includes a list of candidate servers that can potentially provide the content. The directory server also adds the client to the list of candidate servers for the content so that the client can act as a server for the content for subsequent requests from other clients.

In a variation on this embodiment, the list of candidate servers is sorted by network criteria. Network criteria for a given client can include an external IP address that is identical to the external IP address of the given client if the clients are behind a NAT device, an autonomous system (AS) that is identical to or topologically close to the AS of the given client, and an IP/20 network that is identical to or topologically close to the IP/20 network of the given client. In a further variation on this embodiment, the system receives border gateway protocol (BGP) information to facilitate sorting the list of candidate servers, so that candidate servers that are closest topologically to the client will appear higher in the list of candidate servers. Note that the list of candidate servers can also be sorted by other criteria such as load estimates of the candidate servers or performance estimates of the candidate servers.

In a variation on this embodiment, receiving the request for the content from the client further involves: receiving a map of the content that indicates what potions of the content the client already has; receiving the local IP address of the client which the client explicitly included in the request; and receiving the external IP address of the client.

In a variation on this embodiment, the list of candidate servers is a subset of the complete list of candidate servers.

In a variation on this embodiment, the list of candidate servers includes an origin server for the content.

In a variation on this embodiment, if a candidate server from the list of candidate servers is behind a firewall, the directory server sends a request to the candidate server which causes the candidate server to initiate an outbound communications session through the firewall with the requesting client.

In a variation on this embodiment, if a candidate server from the list of candidate servers and the client are both behind firewalls, the directory server sends requests to the candidate server and to the client which cause the candidate server and the client to simultaneously send messages to each other through their respective firewalls to initiate a communications session between the candidate server and the client.

In a variation on this embodiment, the system includes a logging server that facilitates collecting feedback from the client for the directory server to facilitate the candidate subset selection process.

BRIEF DESCRIPTION OF THE FIGURES

FIG. 3 illustrates a network with firewalls in accordance with an embodiment of the present invention.

FIG. 4 illustrates the attributes of a content request in accordance with an embodiment of the present invention.

FIG. 5 illustrates the directory server inventory in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
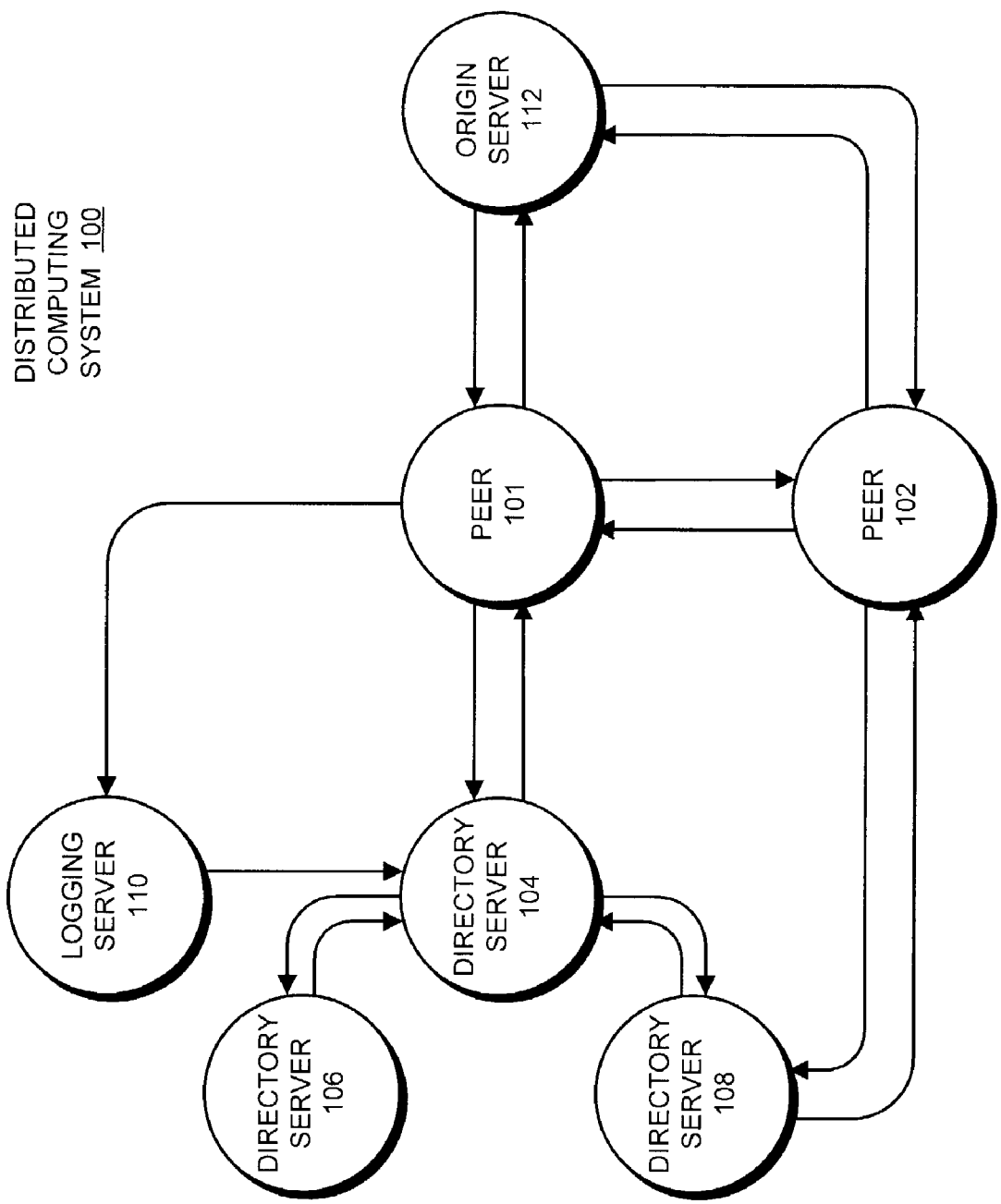
FIG. 1 illustrates a distributed computer system in accordance with an embodiment of the present invention.

FIG. 1 illustrates a distributed computing system 100 in accordance with an embodiment of the present invention. Distributed computing system 100 contains peer 101 and peer 102. Peers 101 and 102 can generally include any node on a network including computational capability and including a mechanism for communicating across the network. Note that peers 101 and 102 can act as clients and as candidate servers that can potentially serve content to other clients. FIG. 1 also contains directory servers 104, 106 and 108, logging server 110, and origin server 112. Servers 104, 106, 108, 110 and 112 can generally include any nodes on a computer network including a mechanism for servicing requests from a client for computational and/or data storage resources.

In one embodiment of the present invention, peer 101 sends a request for content to directory server 104. Directory server 104 may additionally forward or redirect the request on to directory server 106 or directory server 108. Directory server 104 then sends a list of potential candidates back to peer 101. Note that any time a peer makes a request for content, then that peer becomes a potential candidate server for the content and may appear in the list of potential candidate servers that is forwarded to other clients. This list of candidates can optionally identify origin server 112 which contains the original source for the content. Peer 101 then uses this list to request content from peer 102. Peer 101 also sends feedback information back to logging server 110, such as the parts of the content that it has and the servers that it has tried to download from. Logging server 110 subsequently forwards the feedback information from peer 101 to directory server 104. Directory server 104 uses this information in response to future requests for the content.

Directory Server Architecture

Figure 2:
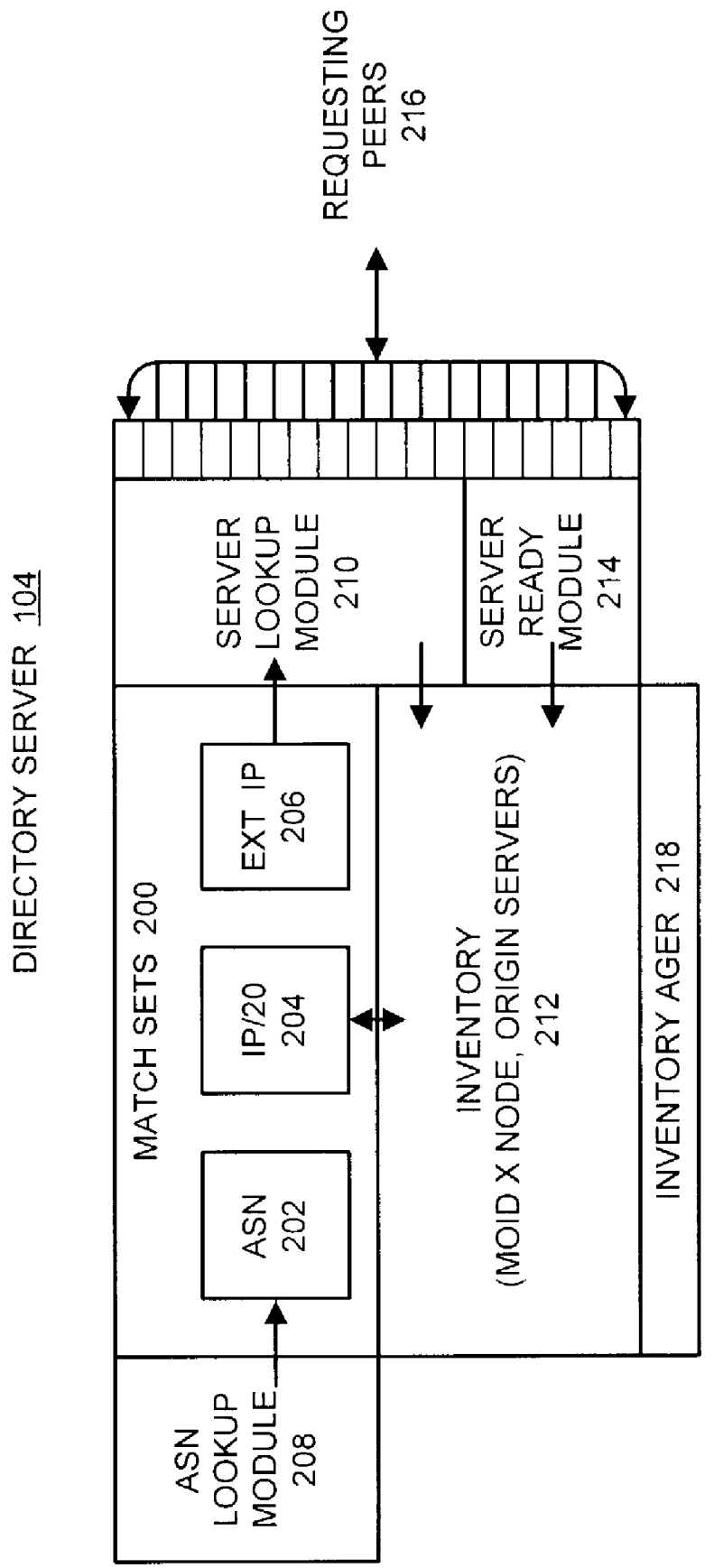
FIG. 2 illustrates the directory server architecture in accordance with an embodiment of the present invention.

FIG. 2 illustrates the architecture of directory server 104 in accordance with an embodiment of the present invention. Directory server 104 contains inventory 212. Inventory 212 includes a list of the potential candidates for items of content that have been published. When one of the requesting peers 216 submits a request to directory server 104 for content, ASN lookup module 208 determines the autonomous system number (ASN) of the autonomous system (AS) of which the peer is a member.

Directory server 104 maintains a set of prioritized lists of inventory 212 based on the items in match sets 200. These items include ASN 202, IP/20 network 204, and external IP address 206. Note that an IP/20 network is a collection of nodes that share a common IP address prefix consisting of 20 bytes. Moreover, an external IP address can include an IP address that has been assigned by a Network Address Translation (NAT) or similar device and can be different from the host's internal IP address. Server lookup module 210 determines the external IP address 206 of the peer and places the information in inventory 212. If a candidate server has an identical external IP address to that of the peer, then it is likely to be topologically close to the peer. Likewise, if it is a member of the same IP/20 network as the peer, then it is also likely relatively to be topologically close to the peer.

Server ready module 214 receives feedback information reported by requesting peers 216 (server ready reports) and updates inventory 212. Inventory ager 218 removes candidates from inventory 212 if directory server 104 has not heard from the candidate servers within a certain period of time.

Network with Firewalls

FIG. 3 illustrates a network with firewalls in accordance with an embodiment of the present invention. In FIG. 3, peer 101 is located behind firewall 300 and peer 102 is located behind firewall 302. Moreover, both peer 101 and peer 102 communicate with directory server 104 through their respective firewalls. During this communication, peer 101 requests content from directory server 104. Next, directory server 104 sends a list of candidate servers, including peer 102, to peer 101. Peer 101 then sends a request to peer 102 for the content via User Datagram Protocol (UDP). Directory server 104 also sends a request to peer 102 to send the content to peer 101. Peer 102 sends a packet to peer 101 via UDP. (Note that in general other connectionless protocols can be used instead of UDP.) Since the request from peer 101 to peer 102 and the packet from peer 102 to peer 101 were sent via a connectionless protocol, they open ports in firewalls 300 and 302 that allows a connection 304 to be established between peer 101 and peer 102.

Attributes of a Content Request

FIG. 4 illustrates the attributes of a content request in accordance with an embodiment of the present invention. Incoming request 400 includes the following attributes: internal IP address 402; external IP address 404, and MOID 408. Note that MOID 408 is a unique identifier of the content that is assigned when the content is published. Internal IP address 402 is the IP address assigned at the node, and external IP address 404 is the IP address of a Network Address Translation (NAT) or similar device. Note that with the popularity of NAT devices, it is very common for peers in a NAT enabled LAN to have different internal IP addresses and an identical external IP address. It is also possible to analyze the content request to determine the ASN for the requestor's AS. ASN is the identifier of the Autonomous System (AS) for which a node belongs.

Directory Server Inventory

FIG. 5 illustrates the directory server inventory 212 from FIG. 2 in accordance with an embodiment of the present invention. Inventory 212 includes a list of all of the content and possible candidate servers of the content that are known by directory server 104. Inventory 212 also contains MOID 408 which identifies the content, node 502 which identifies a candidate server for the content, and range set 504 which identifies the pieces of the content that the candidate server has been reported as having in the past. In one embodiment of the present invention, node 502 is identified using standard PKI techniques.

Initial Content Request

Figure 6:
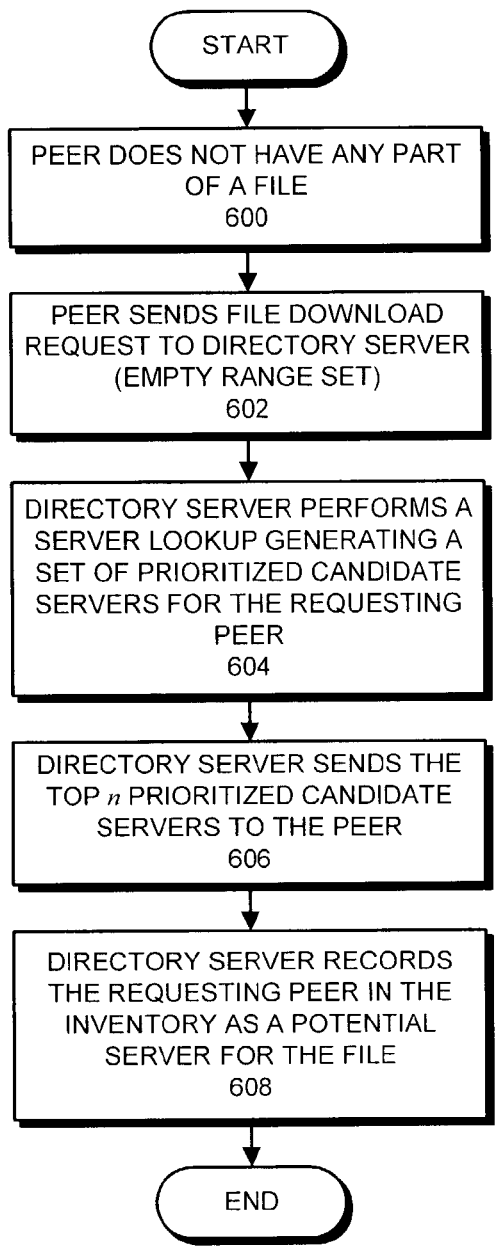
FIG. 6 illustrates processing of an initial content request in accordance with an embodiment of the present invention.

FIG. 6 illustrates processing of an initial content request in accordance with an embodiment of the present invention. The system starts when content is requested and peer 101 does not have any part of the content (step 600).

First, peer 101 sends a file download request to directory server 104 with an empty range set (step 602). Next, directory server 104 performs a server lookup from inventory 212 and generates a prioritized list of candidate servers for the content (step 604). Then, directory server 104 returns the top n candidate servers from the prioritized list to peer 101 (step 606). Finally, directory server 104 records peer 101 in inventory 212 as a possible future candidate server for the content (step 608).

Subsequent Content Request

Figure 7:
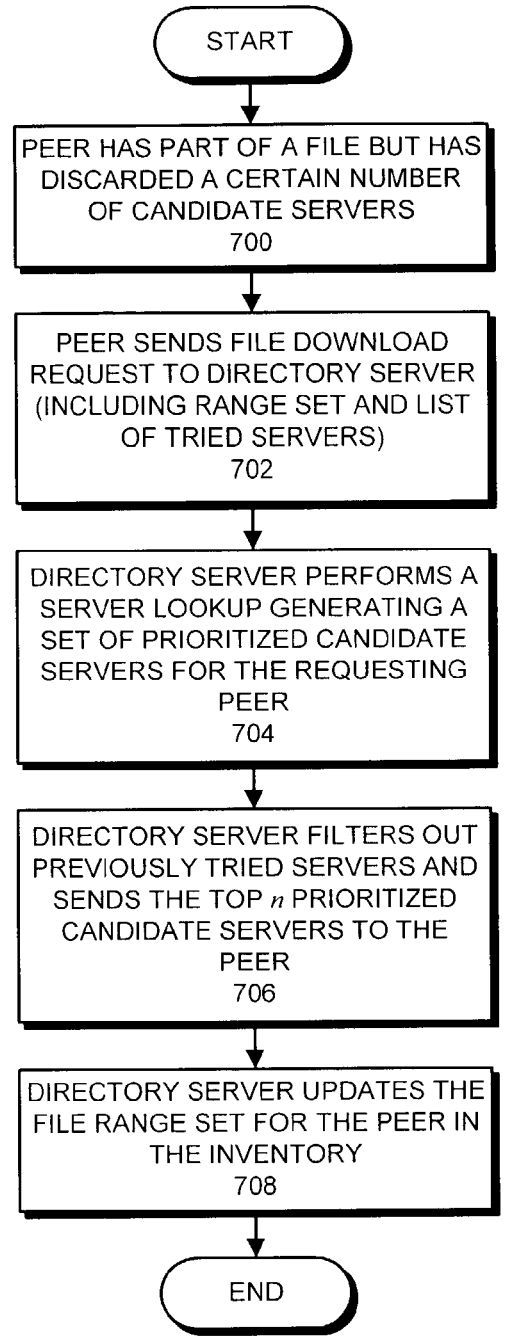
FIG. 7 illustrates processing of a subsequent content request in accordance with an embodiment of the present invention.

FIG. 7 illustrates processing of a subsequent content request in accordance with an embodiment of the present invention. The system starts when peer 101 has received part of a file, but has discarded a certain number of candidate servers for the file (step 700).

First, peer 101 sends a file download request to directory server 104 including an updated range set and a list of tried servers (step 702). Next, directory server 104 performs a server lookup from inventory 212 and generates a prioritized list of candidate servers for peer 101 (step 704). Then, directory server 104 filters out the previously tried servers and returns the top n candidate servers from the prioritized list to peer 101 (step 706). Finally, directory server 104 updates the file range set of the content in inventory 212 for peer 101 (step 708).

Inventory Aging

Figure 8:
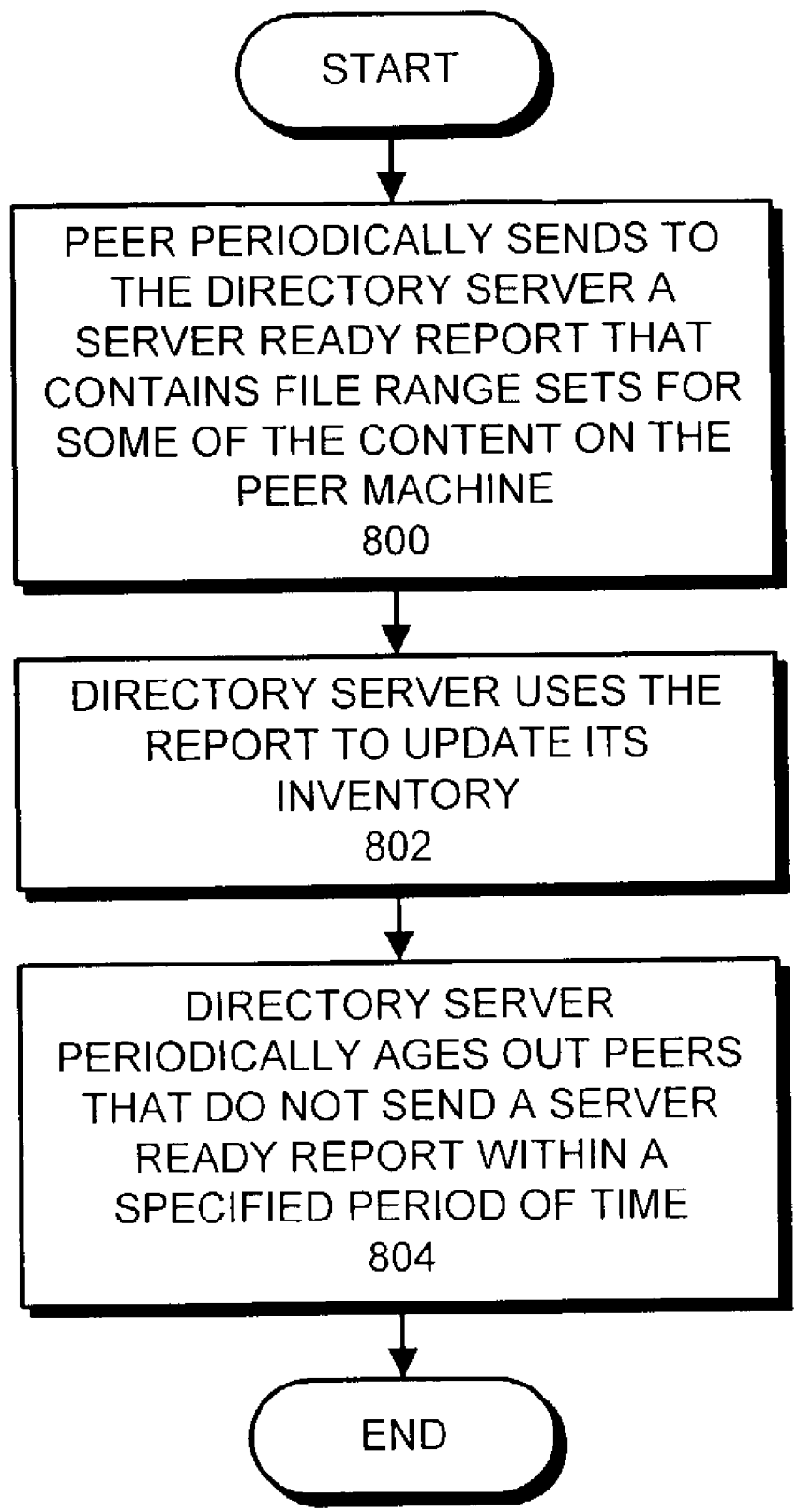
FIG. 8 illustrates the aging of inventory in accordance with an embodiment of the present invention.

FIG. 8 illustrates the process of inventory aging in accordance with an embodiment of the present invention. Peer 101 periodically sends directory server 104 a server ready report that contains file range sets for content that is available on peer 101 (step 800). Note that in one embodiment of the present invention, peer 101 sends the server ready report to logging server 110 which provides the information to directory server 104. Once directory server 104 has this new information, directory server 104 updates inventory 212 to reflect any changes specified by the new information (step 802). In another embodiment of the present invention, peer 101 sends the server ready report directly to directory server 104. Periodically, directory server 104 ages out peers that have not sent a server ready report within a pre-specified period of time (step 804).

Implementation Details

This section provides an overview of the policy governing distribution of data (media objects) in accordance with an embodiment of the present invention. Note that the implementation details described in this section are exemplary and are not meant to limit the present invention.

Peer Overview

The back end of the client (the peer) handles loading and serving, based on metadata and user requests processed by the front end. It devotes a certain number of threads to loading, and to serving (for example, 12 each). Each such loader or server can support one connection. In the absence of throttling, the peer will accept server connections up to this limit, and will establish loader connections up to this limit if there is work to be done.

The peer receives a request to load content. The object is assigned a priority. Higher priority objects are loaded in preference to lower priority objects. If there is work to be done on a higher priority object and no available loader, the lowest priority loader is preempted and reassigned to the higher priority object. In one embodiment of the present invention, there is a file priority for each type of file, and furthermore, there is a peer priority for each peer that can act as a server for the file.

Objects can be prioritized as follows:
1. Objects marked by the front end as "foreground" are associated with the users current activity. These foreground objects take precedence over those marked background, which not directly related to the users current activity (e.g., objects that are automatically pushed by subscription).
2. Otherwise, objects are prioritized first-come, first-served.

The peer transforms the load request into a set of candidate servers or targets. These are potential sources for the content, and are prioritized first by "object priority" (also referred to as "file priority"), and then by target priority (also referred to as "loader priority"). A free loader takes on the highest priority available target. (An exception to this is that a target that does not support range requests is not taken on if there is any other available or loading target for the same object.) A target is generally never taken on by multiple loaders.

The requested object is marked by the front end as either known or unknown. If it is unknown, then the request will provide a hypertext transfer protocol (http) or file transfer protocol (ftp) uniform resource locator (url). Several targets (for example four, or one if bonding is disabled) representing that url are created. If the object is known, then one target is created, representing the directory server expected to provide further targets. The targets returned by the directory server are labeled with target priorities, all greater than the target priority of the directory server itself.

Targets for a loading object are either loading, available, backed off, or marked bad. If the front end pauses and resumes loading of an object, all of its targets are made available. A target is backed off or marked bad if loading from the target ends in an error. A backed-off target becomes available again at a specified time in the future. Repeated backoffs are for greater time intervals, up to a maximum (for example, ¼, 1, 4, 16, and 64 minutes). The backoff interval is reset by successful loading. The directory server starts at a one-minute backoff, even when it returns targets (which resets its backoff interval).

Directory Server Overview

Directory server 104 receives a request for targets for a media object. The request includes the list of targets already known to the requester. Directory server 104 returns a list of targets not already known, with target priorities and the information needed to contact them.

If directory server 104 knows nothing about the object, then it will tell the requester to stall five seconds and try again. Meanwhile, it will contact the metadata server for information about the object. The metadata server contains information about all of the published content including the original source for the content. If this fails, it remembers the failure for a period of time (for example, two minutes), and tells any peers requesting targets for that object that it is not found. (This causes the peers to abort the download.) If the metadata fetch succeeds, then directory server 104 learns of one or more origin servers that it can return as targets.

If directory server 104 provides the requester with potential targets, then it adds the requester to its set of possible targets. The requester will expire out of this set after a period of time (for example, two hours, or immediately if the requester has opted out of the network). To keep the directory server target set fresh, peers report periodically (for example, hour) what objects they can serve.

Directory Server Response Policy

The list of targets (peers and origins) returned for a known object is determined as follows (in order of decreasing precedence):
1. If a target is reported as known by the requester, then it is not returned.
2. Each request from the requester for the object that results in returned targets is counted. If sufficient time has elapsed since the last satisfied request (say 30 minutes), then the count is reset. If the count is 500 or higher, then no peer targets are returned. This protects peer and directory server from excessive requests.
3. At most a pre-specified number of targets are returned.
4. Aged out peers are not returned.
5. Each return of a peer (as a target for any object) is counted. When a peer visits directory server 104, this count is reset to the peer's current number of active serving threads.
6. Targets of highest priority are returned.
7. Origins are assigned lower priority than peers.
8. Peers have a base priority of two. If they have a nonzero return count, then their base priority is one divided by return count. (This distributes load)
9. Peer priority is increased by 330 (=10(32+1)) if it has the same external IP address as the requester. Otherwise, peer priority is increased by 210 (=10(20+1)) if it shares the first 20 bits (configurable) of its external IP address with the requester. Otherwise, peer priority is increased by 10 (=10(0+1)) if it is in the same (nonzero) ASN as the requester. (prefers local sources)

Peer Loader Overview

The peer loader, which is a mechanism that receives a piece of a file, requests data from a target one range at a time. This range size needs to be big enough that the request overhead is small, but small enough that the peer can quickly adapt to changing loader availability and performance. The loader reads this range one read-range at a time. The read-range size, which facilitates throttling, is the expected size downloadable in one second, and has a 10 second timeout. Errors and other loader exit conditions are checked after each read-range, and the read is interruptible if the download is finished or canceled. Request range size is capped at the larger of 128 kB and the read-range.

Range Allocation

A target that does not support range requests is effectively asked for the first needed range. Any other target is asked for a range starting at a preferred offset, and stopping at the size cap, the EOF, or the next range already loaded or allocated to a loader. If a loader reaches a range allocated to another loader, it is preempted (the loader gives up the target, which is made available for other loaders). When there is little left to download, loaders may all load the same range (racing to finish the download).

To find the preferred offset, the loader first generates a candidate range set, then chooses a range from the set. The candidate range set can be the first of the following that is nonempty:
1. set of bytes that are unallocated, that the target has, and that all other incomplete loading targets don't have (so peer is completing a different range than its "neighbors");
2. set of bytes that are unallocated, and that the target has;
3. set of bytes that are unallocated; and
4. set of bytes that are allocated to another loader.

Then the chosen range from that range set can be either:
1. contiguous with the last range received from the target;
2. part of an open-ended range at the end of a set of unknown maximum size;
   The offset is at a distance of 32* (the range size cap) from the beginning of this range. (This is to discover how far the file extends by stepping out until EOF is found.)
3. part of the largest range in the range set;
   The offset is at the middle of this range if there are enough bytes thereafter for a full size range, or if the range bytes are allocated to another loader. (If loaders attempt to start their loads as far from each other as possible, then they will be better able to load contiguously before bumping into something already loaded by someone else.)
   Otherwise, the offset is at the beginning of this range. (So ranges are not subdivided down to inefficiently small sizes.)

Errors

I/O errors cause a backoff. An exception is when a connection to a peer target cannot be made; this causes the target to be marked bad. If a target reports an inconsistent file size, or that it doesn't have the object file or doesn't grant permission to load, then the target is marked bad. If the directory server returns such a report, then the download is aborted.

Every file has a signature that is composed of a set of block signatures. During the download, each 1 MB block is checked as it is completed. If a block check fails, then any peer targets contributing to it are marked bad. If the block was supplied entirely by origins, then the download is aborted.

A backoff error can also be caused by poor service. Poor service can be defined as no bytes for two minutes, or if after two minutes all loaders are busy, and there is an available target for the object, and this loader is getting less than a third the average bandwidth for loaders of this object or less than 250 bytes/sec.

A stall request greater than ten seconds, or one from a directory server, is handled as a backoff (the loader gives up the target) rather than a pause.

Peer Server Overview

If a peer is opted out of the network, or does not know of an object, or its copy is bad, then it will not serve the object. Otherwise, it serves the largest contiguous range of bytes that it has that have been signature checked (if there was a block signature) and that the requester requested. Signature checking involves calculating a checksum of a block, and comparing it to an encrypted checksum from a trusted source to ensure data integrity. If there are no such bytes, then the server will tell the requester to stall for 5 seconds and then try again. The server reports what bytes it has to the requester, so the next request can be better informed. If the server is still loading the object, then it adds the requester to its list of targets. (The server learns what bytes the requester has as part of the request.)

Implementation Notes

Each peer, and the directory server, maintains an in-memory database, or inventory, of objects and targets. The inventory is a set of object entries (MOs), a set of peer and origin entries (Nodes), and a set of entries with information about the state of the object on the peer or origin (MONodes). Each entry contains information about the relevant entity. For example, Nodes contain contact information such as IP addresses and ports, and MONodes contain a range set that records which portions of an object file are available on a peer or origin. The inventory also maintains subsets of these sets sorted by various criteria to make access fast. For example, the inventory maintains subsets of MONodes sorted by object and then by target priority. The directory server lazily removes expired entries. The peer removes target entries when the download is complete or canceled, and removes object entries when the object is deleted.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for receiving content at a client from one or more candidate servers that can provide the content, comprising the client:
   sending a request to a directory server, the request including a range set that identifies pieces of the content that have previously been received by the client;
   in response to the request, receiving a response from the directory server that includes a list of the candidate servers that can potentially provide the content;
   sending a request for the content to at least one candidate server from the list of candidate servers; and
   receiving the content from at least one candidate server.

2. The method of claim 1, wherein receiving the content from at least one candidate server involves receiving portions of the content from multiple candidate servers and assembling the portions at the client.

3. The method of claim 1, further comprising sending feedback to the directory server, wherein the feedback can include a map of the content which can indicate:
   which portions of the content have been received by the client;
   which portions of the content are currently being received by the client; and
   which portions of the content t have not been received by the client.

4. The method of claim 1, further comprising sending feedback to the directory server, wherein the feedback can include status information for candidate servers, which can indicate:

an availability of a given candidate server;
a performance indicator for the given candidate server; and
a trace of the path from the client to the given candidate server.

5. The method of claim 1, wherein sending the request to the directory server for the content further involves sending:
   a map of the content that indicates what potions of the content the client already has; and
   the local IP address of the client.

6. The method of claim 1, further comprising:
   receiving a request at the client from a secondary client to send the content to the secondary client; and
   in response to the request, sending the content to the secondary client.

7. The method of claim 6, wherein the process of sending the content to the secondary client takes place while the content is being received by the client.

8. The method of claim 1, wherein the list of candidate servers is a subset of a complete list of candidate servers.

9. The method of claim 1, further comprising sending a second request to the directory server when the client has identified a non-responsive candidate server that did not respond with the content, the second request including the non-responsive candidate server.

10. The method of claim 1, wherein the list of candidate servers includes an origin server containing the original source for the content.

11. The method of claim 1, wherein if the content was not available from a candidate server in the list of candidate servers, the method further comprises waiting a set period of time before again trying to receive the content from the candidate server.

12. The method of claim 11, wherein the set period of time increases each time the client is unsuccessful in receiving the content from a candidate server in the list of candidate servers.

13. The method of claim 11, wherein if the content was not available from a candidate server in the list of candidate servers in a certain amount of time, the method further comprises removing the candidate server from the list of candidate servers.

14. The method of claim 11, wherein if a candidate server in the list of candidate servers does not meet certain performance criteria, the method further comprises removing the candidate server from the list of candidate servers.

15. A method for enabling the sending of content to a client in a distributed manner, comprising:
   receiving a request from the client at a directory server, the request including a range set that identifies pieces of the content that have previously been received by the client;
   sending a response to the client that includes a list of candidate servers that can potentially provide the content; and
   adding the client to the list of candidate servers for the content so that the client can act as a server for the content for subsequent requests from other clients for the content.

16. The method of claim 15, wherein the list of candidate servers is sorted by network criteria, wherein network criteria for a given client can include:
   an external IP address that is identical to the external IP address of the given client;
   an autonomous system (AS) that is identical to or topologically close to the AS of the given client; and
   an IP/20 network that is identical to the IP/20 network of the given client.

17. The method of claim 16, further comprising receiving border gateway protocol (BGP) information to facilitate sorting the list of candidate servers, so that candidate servers that are closest topologically to the client will appear higher in the list of candidate servers.

18. The method of claim 15, wherein receiving the request for the content from the client further involves:
   receiving a map of the content that indicates what potions of the content the client already has;
   receiving the local IP address of the client which the client explicitly included in the request; and
   receiving the external IP address of the client.

19. The method of claim 15, wherein the list of candidate servers is a subset of a complete list of candidate servers.

20. The method of claim 15, wherein the list of candidate servers includes an origin server for the content.

21. The method of claim 15, wherein if a candidate server from the list of candidate servers is behind a firewall, the method further involves sending a request to the candidate server which causes the candidate server to initiate a communications session through the firewall with the client.

22. The method of claim 15, wherein if a candidate server from the list of candidate servers and the client are behind firewalls, the method further involves sending requests to the candidate server and the client which cause the candidate server and the client to simultaneously send messages to each other through their respective firewalls to initiate a communication session between the candidate server and the client.

23. The method of claim 15, further comprising collecting feedback from the client at a reporting server for the directory.

24. The method of claim 15, further comprising:
   receiving a second request from the client, the second request including a list of non-responsive candidate servers that did not provide the requested content; and
   sending a second response to the client, the second response including an updated list of candidate servers, the updated list of candidate servers generated by filtering out the list of non-responsive candidate servers.

25. A computer-readable storage medium storing instructions that when executed by a computer cause the computer to perform a method for receiving content at a client from one or more candidate servers, the method comprising:
   sending a request to a directory server that stores information on where the content is possibly located, the request including a range set that identifies pieces of the content that have previously been received by the client;
   in response to the request, receiving a response from the directory server that includes a list of candidate servers;
   sending a request to at least one candidate server from the list of candidate servers for the content; and
   receiving the content from at least one candidate server.

26. The computer-readable storage medium of claim 25, wherein receiving the content from at least one candidate server involves receiving portions of the content from multiple candidate servers and assembling the portions at the client.

27. The computer-readable storage medium of claim 25, wherein the method further comprises sending feedback to the directory server, wherein the feedback can include a map of the content which can indicate:
   which portions of the content have been received by the client;
   which portions of the content are currently being received by the client; and
   which portions of the content that have not been received by the client.

28. The computer-readable storage medium of claim 25, wherein the method further comprises sending feedback to the directory server, wherein the feedback can include status information for candidate servers, which can indicate:
an availability of a given candidate server;
a performance indicator of the given candidate server; and
a trace of the path from the client to the given candidate server.

29. The computer-readable storage medium of claim 25, further comprising:
receiving a request for content from a secondary client, the process of sending the content to the secondary client takes place while the content is being received by the client; and
in response to the request, sending the content to the secondary client.

30. The computer-readable storage medium of claim 25, wherein the list of candidate servers is a subset of a complete list of candidate servers.

31. The computer-readable storage medium of claim 25, wherein the method further comprises sending a sending a second request to the directory server when the client has identified a non-responsive candidate server that did not respond with the content, the second request including the non-responsive candidate server.

32. The computer-readable storage medium of claim 25, wherein the list of candidate servers includes an origin server containing the original source for the content.

33. The computer-readable storage medium of claim 25, wherein if the content was not available from a candidate server in the list of candidate servers, the method further comprises waiting a set period of time before again trying to receive the content from the candidate server.

34. The computer-readable storage medium of claim 33, wherein the set period of time increases each time the client is unsuccessful in receiving the content from any candidate server in the list of candidate servers.

35. The computer-readable storage medium of claim 33, wherein if the content was not available from a candidate server in the list of candidate servers in a certain amount of time, the method further comprises removing the candidate server from the list of candidate servers.

36. The computer-readable storage medium of claim 33, wherein if a candidate server in the list of candidate servers does not meet certain performance criteria, the method further comprises removing the candidate server from the list of candidate servers.

37. A computer-readable storage medium storing instructions that when executed by a computer cause the computer to perform a method for enabling sending of content to a client in a distributed manner, comprising:
receiving a request from the client at a directory server, the request including a range set that identifies pieces of the content that have previously been received by the client;
sending a response to the client that includes a list of candidate servers that can potentially provide the content; and
adding the client to the list of candidate servers for the content so that the client can act as a server for the content for subsequent requests from other clients for the content.

38. The computer-readable storage medium of claim 37, wherein the list of candidate servers is sorted by network criteria, wherein network criteria for a given client can include:
an external IP address that is identical to the external IP address of the given client;
an autonomous system (AS) that is identical to or topologically close to the AS of the given client; and
an IP/20 network that is identical to the IP/20 network of the given client.

39. The computer-readable storage medium of claim 38, wherein the method further comprises receiving border gateway protocol (BGP) information to facilitate sorting the list of candidate servers, so that candidate servers that are closest topologically to the client will appear higher in the list of candidate servers.

40. The computer-readable storage medium of claim 37, further comprising:
receiving a second request from the client, the second request including a list of non-responsive candidate servers that did not provide the requested content; and
sending a second response to the client, the second response including an updated list of candidate servers, the updated list of candidate servers generated by filtering out the list of non-responsive candidate servers.

41. The computer-readable storage medium of claim 37, wherein the list of candidate servers is a subset of a complete list of candidate servers.

42. The computer-readable storage medium of claim 37, wherein the list of candidate servers includes an origin server for the content.

43. The computer-readable storage medium of claim 37, wherein if a candidate server from the list of candidate servers is behind a firewall, the method further involves sending a request to the candidate server which causes the candidate server to initiate a communications session through the firewall with the client.

44. The computer-readable storage medium of claim 37, wherein if a candidate server from the list of candidate servers and the client are behind firewalls, the method further involves sending requests to the candidate server and the client which cause the candidate server and the client to simultaneously send messages to each other through their respective firewalls to initiate a communication session between the candidate server and the client.

45. The computer-readable storage medium of claim 37, wherein the method further comprises collecting feedback from the client at a reporting server for the directory server.

46. An apparatus for receiving content at a client from one or more content servers, comprising:
a requesting mechanism configured to send a request to a directory server, the request including a range set that identifies pieces of the content that have previously been received by the client;
a receiving mechanism configured to receive a response from the directory server that includes a list of candidate servers that can potentially provide the content;
a secondary requesting mechanism configured to send a request to at least one candidate server from the list of candidate servers for the content; and
a secondary receiving mechanism configured to receive the content from at least one candidate server.

47. The apparatus of claim 46, wherein the secondary receiving mechanism is further configured to receive portions of the content from multiple candidate servers and assembling the portions at the client.

48. The apparatus of claim 46, further comprising a feedback mechanism that is configured to send feedback to the directory server, wherein the feedback can include a map of the content which can indicate:
which portions of the content have been received by the client;

which portions of the content are currently being received by the client; and
which portions of the content have not been received by the client.

49. The apparatus of claim 46, further comprising a feedback mechanism that is configured to send feedback to the directory server, wherein the feedback can include status information for candidate servers, which can indicate:
an availability of a given candidate server;
a performance indicator for the given candidate server; and
a trace of the path from the client to the given candidate server.

50. The apparatus of claim 46, wherein the requesting mechanism is further configured to send to the directory server along with the request for the content:
a map of the content that indicates what potions of the content the client already has; and
the local IP address of the client.

51. The apparatus of claim 46, further comprising:
a sharing mechanism configured to receive a request at the client from a secondary client to send the content to the secondary client; and
a server mechanism configured to send the content to the secondary client, while the content is being received by the client.

52. The apparatus of claim 46, wherein the list of candidate servers is a subset of a complete list of candidate servers.

53. The apparatus of claim 46, wherein the requesting mechanism is further configured to send a second request to the directory server when the client has identified a non-responsive candidate server that did not respond with the content, requesting an updated list of candidate servers, the second request including the non-responsive candidate server.

54. The apparatus of claim 46, wherein the list of candidate servers includes an origin server containing the original source for the content.

55. The apparatus of claim 46, wherein if the content was not available from a candidate server in the list of candidate servers, the requesting mechanism is further configured to wait a set period of time before again trying to receive the content from the candidate server.

56. The apparatus of claim 55, wherein the set period of time increases each time the client is unsuccessful in receiving the content from any candidate server in the list of candidate servers.

57. The apparatus of claim 55, wherein the requesting mechanism is further configured to remove the candidate server from the list of candidate servers if the content was not available from the candidate in a certain amount of time.

58. The apparatus of claim 55, wherein the requesting mechanism is further configured to remove the candidate server from the list of candidate servers if the candidate server does not meet certain performance criteria.

59. An apparatus for enabling sending of content to a client in a distributed manner, comprising:
a receiving mechanism to receive a request from the client, the request including a range set that identifies pieces of the content that have previously been received by the client;
a sending mechanism to send a response to the client that includes a list of candidate servers that can potentially provide the content; and
a directory mechanism to add the client to the list of candidate servers for the content so that the client can act as a server for the content for subsequent requests from other clients for the content.

60. The apparatus of claim 59, further comprising a sorting mechanism configured to sort the list of candidate servers by network criteria, wherein network criteria for a given client can include:
an external IP address that is identical to the external IP address of the given client;
an autonomous system (AS) that is identical to or topologically close to the AS of the given client; and
an IP/20 network that is identical to the IP/20 network of the given client.

61. The apparatus of claim 60, wherein the sorting mechanism is further configured to receive border gateway protocol (BGP) information to facilitate sorting the list of candidate servers, so that candidate servers that are closest topologically to the client will appear higher in the list of candidate servers.

62. The apparatus of claim 59, wherein the receiving mechanism is further configured to:
receive a map of the content that indicates what potions of the content the client already has;
receive the local IP address of the client which the client explicitly included in the request; and
receive the external IP address of the client.

63. The apparatus of claim 59, wherein the list of candidate servers is a subset of a complete list of candidate servers.

64. The apparatus of claim 59, wherein the list of candidate servers includes an origin server for the content.

65. The apparatus of claim 59, wherein if a candidate server from the list of candidate servers is behind a firewall, the sending mechanism is further configured to send a request to the candidate server which causes the candidate server to initiate a communications session through the firewall with the client.

66. The apparatus of claim 59, wherein if a candidate server from the list of candidate servers and the client are behind firewalls, the sending mechanism is further configured to send requests to the candidate server and the client which cause the candidate server and the client to simultaneously send messages to each other through their respective firewalls to initiate a communication session between the candidate server and the client.

67. The apparatus of claim 59, further comprising a logging server that is configured to collect the feedback from the client for the directory server.

68. The apparatus of claim 59, further comprising:
the receiving mechanism further to receive a second request from the client, the second request including a list of non-responsive candidate servers that did not provide the requested content; and
a sorting mechanism to generate an updated list of candidate servers by filtering out the list of non-responsive candidate servers.

69. A means for receiving content at a client from one or more candidate servers, comprising:
a sending means for sending a request for a list of candidate servers to a directory server, the request including a range set that identifies pieces of the content that have previously been received by the client;
a receiving means for receiving a response from the directory server that includes the list of candidate servers that can potentially provide the content;
a secondary sending means for sending a request to at least one candidate server from the list of candidate servers for the content; and
a secondary receiving means for receiving the content from at least one candidate server.

70. A means for enabling the sending of content to a client in a distributed manner, comprising:
- a receiving means for receiving a request from the client at a directory server, the request including a range set that identifies pieces of the content that have previously been received by the client;
- a sending means for sending a response to the client that includes a list of candidate servers that can potentially provide the content; and
- an adding means for adding the client to the list of candidate servers for the content so that the client can act as a server for the content for subsequent requests from other clients for the content.

* * * * *